United States Patent [19]
Nakamoto et al.

[11] Patent Number: 6,096,838
[45] Date of Patent: Aug. 1, 2000

[54] METHOD AND APPARATUS FOR CONTINUOUS POLYCONDENSATION

[75] Inventors: Hidekazu Nakamoto; Susumu Harada; Chikao Oda; Yasunari Sase; Michio Suzuki, all of Kudamatsu, Japan

[73] Assignee: Hitachi, Ltd., Tokyo, Japan

[21] Appl. No.: 09/242,903

[22] PCT Filed: Sep. 3, 1997

[86] PCT No.: PCT/JP97/03083

§ 371 Date: Feb. 25, 1999

§ 102(e) Date: Feb. 25, 1999

[87] PCT Pub. No.: WO98/10007

PCT Pub. Date: Mar. 12, 1998

[30] Foreign Application Priority Data

| Sep. 4, 1996 | [JP] | Japan | 8-233855 |
| Sep. 4, 1996 | [JP] | Japan | 8-233857 |
| Sep. 20, 1996 | [JP] | Japan | 8-249769 |
| May 19, 1997 | [JP] | Japan | 9-128267 |

[51] Int. Cl.$^7$ .............. C08F 2/00; C08G 85/00
[52] U.S. Cl. .............. 526/64; 528/272; 526/65; 526/66; 526/67; 526/68; 526/71
[58] Field of Search .............. 528/272; 526/64, 526/65, 66, 67, 68, 71

[56] References Cited

U.S. PATENT DOCUMENTS 5,434,239  7/1995  Bhatia ........................ 528/274

OTHER PUBLICATIONS

George Odian, "Principles of Polymerization", Second Edition, John Wiley & Sons, New York, 1981.

Primary Examiner—Samuel A. Acquah
Attorney, Agent, or Firm—Antonelli, Terry, Stout & Kraus, LLP

[57] ABSTRACT

An apparatus for continuously producing polyester comprises three single reactors, i.e. a single esterification reactor (first reactor), a single initial polymerization reactor (second reactor) and a single final polymerization reactor (third reactor or final polymerizer), where at least one of the first reactor and the second reactor is free from an external stirring power source, or the third reactor is a horizontal, one-shaft-type, low speed rotation type reactor. Necessary number of reactors for the esterification and polycondensation reactions can be a minimum and necessary stirring power consumption for the reaction can be a miminum, and thus polyester polymers of good quality can be efficiently produced at a minimum energy cost in a necessary minimum reactor structure.

17 Claims, 12 Drawing Sheets

6,096,838

METHOD AND APPARATUS FOR CONTINUOUS POLYCONDENSATION

TECHNICAL FIELD

The present invention relates to a process and an apparatus for continuous polycondensation of polymers of polyester series such as polyethylene terephthalate, polybutylene terephthalate, etc., from an aromatic dicarboxylic acid or its derivative and a glycol.

BACKGROUND ART

According to the conventional process for producing polymers of polycondensation series of polyethylene terephthalate, etc., raw materials terephthalic acid and ethylene glycol are fed to a mixing tank in an appropriate proportion for esterification and the mixture is then fed to esterification reactor tanks through a pump. In the esterification step, 2 or 3 stirring tanks each provided with stirring vanes are provided in series and a water effluent as a by-product is separated in a distillation column. A prepolymerization step follows, where a plurality of vertical stirring tanks or horizontal stirring tanks are provided, and a final polymerization step follows, where a horizontal stirring tank is provided. The tanks of these polymerization steps are each provided with a condeser for removing an effinent ethylene glycol as a by-product, and are operated in a reduced pressure atmosphere. In the conventional process for producing polyester there are 4 to 6 reactor tanks, each of which is provided with strring vanes and its power source and further provided with a distillation column or a condenser for separating and removing the by-product. Furthermore, the polymerization steps are operated in a reduced pressure atmosphere, and thus the necessary additional vacuum means for generation of a reduced pressure is required. That is, the operation of the apparatus requires a higher maintenance cost and a higher apparatus cost. One example of the related art is disclosed in JP-A 7-207009, where each tank is provided with stirring vanes and is vacuum-controlled, and thus its running or operation is complicated. That is, improved apparatus and process with a higher efficiency throughout the apparatus and economical operation based on energy saving throughout the apparatus have been so far desired for the production of high molecular weight polyester.

DISCLOSURE OF THE INVENTION

An object of the present invention is to provide a process and an apparatus for continuous polycondensation, capable of efficiently producing a high molecular weight polyester.

Another object of the present invention is to provide a process and an apparatus for continuous polycondensation, capable of efficiently producing a high molecular weight polyester with simple apparatus structure and arrangement.

Other object of the present invention is to provide an apparatus for continuous polycondensation and a process for continuous polycondensation, which can overcome the problems of the above-mentioned prior art and can conduct more efficient reaction to produce polymers of good quality with a minimum energy through minimum necessary reactor structure and arrangement.

According to a first aspect of the present invention, a process for continuously producing polyester is provided, which comprises a first step of reacting an aromatic dicarboxylic acid or its derivative with a glycol in a first reactor, thereby producing an oligoester or a polyester having an average degree of polymerization of 3 to 7; a second step of polycondensing the oligoester or polyester of the first step in a second reactor, thereby producing a low molecular weight polyester having an average degree of polymerization of 20 to 40; and a third step of further polycondensing the low molecular weight polyester of the second step to an average degree of polymerization of 90 to 180 in a third reactor, thereby producing a high molecular weight polyester, wherein at least one of the first reactor and the second reactor is free from an external power soure stirring means; or wherein a reactor is used as the third reactor, which comprises a horizontal cylindrical vessel having an inlet for the low molecular weight polyester of the second step at the lower part at one end thereof and an outlet for the high molecular weight polyester at the lower part at the other end thereof in the longitudinal direction thereof, an outlet for volatile matters at the upper part thereof, and a stirring rotor rotatable in the vicinity of the inner periphery of the vessel in the longitudinal direction of and within the vessel, the stirring rotor within the vessel comprising a plurality of stirring blocks according to the viscosity level of the polyester, and the stirring rotor having stirring vanes without any rotating shaft at the center of the stirring rotor; more preferably wherein a mixture of the aromatic dicarboxylic acid or its derivative and the glycol in a molar ratio of 1:1.05 to 1:2.0 of the former to the latter is fed to the first reactor kept at a temperature of 240° to 285° C. under a pressure of the atmospheric pressure to $3 \times 10^6$ Pa; the oligoester or polyester from the first reactor is fed to the second reactor kept at a temperature of 250° to 290° C. under a pressure of the atmospheric pressure to 133 Pa; and the low molecular weight polyester from the second reactor is fed to the third reactor kept at a temperature of 270° to 290° C. under a pressure of 200 to 13.3 pa; more preferably wherein the stirring rotor is rotated at 0.5 to 10 rpm; and more preferably wherein total reaction time throughout the first reactor, the second reactor and the third reactor is 4 to 8 hours.

According to a second aspect of the present invention, an apparatus for continuously producing polyester is provided, which comprises a first reactor for reacting an aromatic dicarboxylic acid or its derivative with a glycol, thereby producing an oligoester or polyester having an average degree of polymerization of 3 to 7; a second reactor for polycondensing the oligoester or polyester from the first reactor, thereby producing a low molecular weight polyester having an average degree of polymerization of 20 to 40; and a thrid reactor for further polycondensing the low molecular weight polyester from the second reactor to an average degree of polymerization of 90 to 180, thereby producing a high molecular weight polyester, wherein at least one of the first reactor and the second reactor is free from an external power source stirring means; or wherein the third reactor comprises a horizontal cylindrical vessel having an inlet for the low molecular weight polyester from the second reactor at the lower part at one end thereof and an outlet for the high molecular weight polyester at the lower part at the other end thereof in the longitudinal direction thereof, an outlet for volatile matters at the upper part thereof, and a stirring rotor rotatable in the vicinity of the inner periphery of the vessel in the longitudinal direction of and within the vessel, the stirring rotor within the vessel comprising a plurality of stirring blocks according to the viscosity level of polyester feed and the stirring rotor having stirring vanes without any rotating shaft at the center of the stirring rotor; more preferably wherein the first reactor is conduct the reaction at a temperature of 240° to 285° C. under a pressure of the atmospheric pressure to $3 \times 10^6$ Pa; the second reactor is to conduct the polycondensation at a temperature of 250° to 290° C. under a pressure of the atmospheric pressure to 133 Pa, and the third reactor is to conduct the further polycondensation at a temperature of 270° to 290° C. under a pressure of 200 to 13.3 Pa.

The above-mentioned objects of the present invention can be attained by using three single reactors each for a esterification step, a prepolymerization step and a final polymerization step, where single reactor without any external power supply are used for at least one of the esterification step and the prepolymerization step, and a stirring power-requiring reactor is used for the final polymerization step. The first reactor for the esterification step according to the present invention is, for example, a natural circulation type evaporator comprising a vertical cylindrical vessel provided with an inlet and an outlet for a raw material feed such as a mixture an aromatic dicarboxylic acid or its derivative and a glycol and an oligoester or polyester at the bottom of the vessel and further with a vapor pipe for discharging the vapors at the top of the vessel; a heating medium jacket covering the outside of the vessel; and a shell-and-tube type heat exchanger within the vessel, the tube outside of the heat exhchanger being heated by a heating medium, while allowing the raw material feed to rise through the tubes to unnecessitate the external power. It is desirable for the natural circulation type evaporator to make the average speed of the liquid feed flowing downwards by natural convection between the inner wall of the cylindrical vessel and the outer wall of the shell of the sheel-and-tube type heat-exchanger smaller than the average speed of the liquid feed rising through the tubes of the shell-and-tube type heat exchanger and also to provide an entrance space at the bottom of the shell-and-tube type heat exchanger so as to allow the internally circulating raw materials to uniformly enter into the tubes.

For the second reactor for the prepolymerization step is used an apparatus comprising, for example, a substantially vertical cylindrical vessel provided with an inlet for an oligopolyester or polyester feed from the first reactor and an outlet for a low molecular weight polyester feed on the lower end side and at the bottom at the center of the vessel, respectively, in the longitudinal direction of the vessel, and further with an outlef for volatile matters at the top of the vessel, and covered with a heating medium jacket on the outside of the vessel, thereby to unnecessitate any external power. The second reactor may be further provided with a heat-exchanging section at the lower part within the vessel and a residence section with helical baffle plates at the intermediate part within the vessel so as to retain the liquid feed and transfer the polyester feed successively from a lower stage to a upper stage, further with a space for gas-liquid separation at the upper part within the vessel and a down pipe in the vertical direction at the center within the vessel so as to allow the polyester feed to flow downwards as a thin film.

For the third reactor for the final polymerization step is used an apparatus comprising, for example, a horizontal cylindrical vessel provided with an inlet for the low molecular weight polyester feed from the second reactor at the lower part at one end and an outlet for a high molecular weight polyester at the lower part at the other end, respectively, of the vessel in the longitudinal direction thereof, and further with an outlet for volatile matters at the top of the vessel and a stirring rotor, which is extended in the longitudinal direction of the vessel and rotates in the vicinity of the inner periphery of the vessel, the stirring rotor within the vessel being divided into a plurality of stirring blocks according to the viscosity level of the polyester feed, and the stirring rotor being without a rotating shaft but with stirring vanes at the center part of the strring rotor.

BRIEF DESCRIPTION AT THE DRAWINGS

BEST MODES FOR CORRYING OUT THE INVENTION

Figure 1:
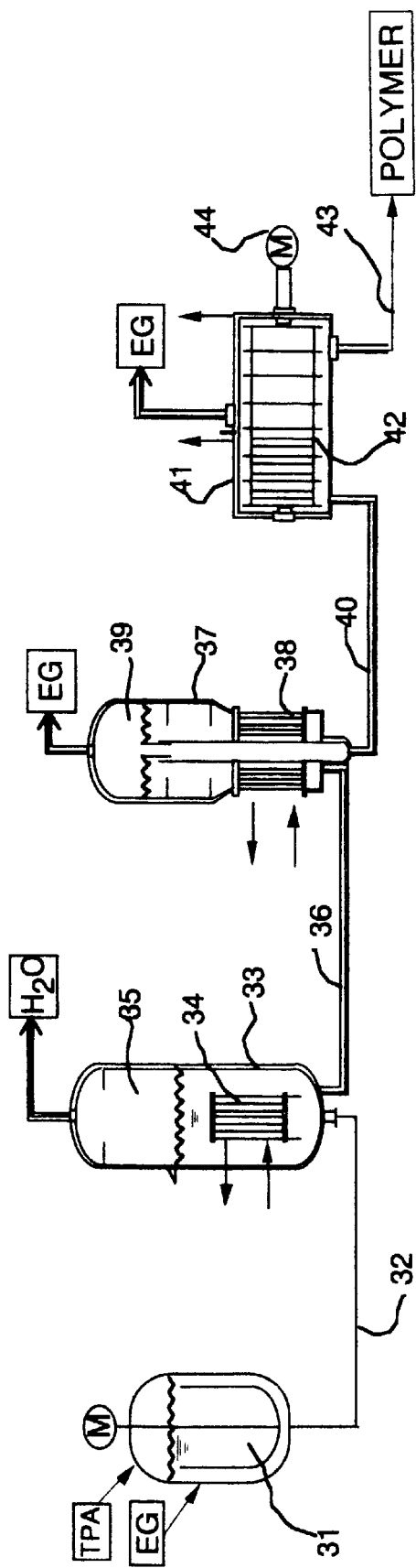
FIG. 1 is a flow diagram showing an arrangement of reactors for a process for continuously producing polyethylene terephthalate according to one embodiment of the present invention.

FIG. 1 shows one embodiment of the present invention, i.e. a flow diagram showing an arrangement of reactors for a process for continuously producing polyethylene terephthalate. Economically very advantageous industrious process for producing polyester is a direct esterification process, which has been reconlty much employed. In FIG. 1, numeral 31 shows a feed mixing tank for mixing and stirring TPA (terephthalic acid) as an aromatic dicarboxylic acid and EG (ethylene glycol) as a glycol in a molar ratio of 1:1.05 to 1:2.0 of the former to the latter both being raw materials for producing polyethylene terephthalate. At this eterification stage of the process, a polymerization catalyst or additives such a stabilizer, a color tone regulator, etc. can be used together, when required.

Polymerization catalyst includes, for example, metal compounds derived from antimony, titanium, germanium, tin, zinc, etc. It is well known that not only the reaction rate, but also hue and heat stability of the resulting polyester depend upon the type and combinations of the catalyst used. Furthermore, the esterification reaction is carried out in the presence of a catalyst at a high temperature for a long time, resulting in occurrence of various side reactions, which discolor the polyester into yellow, increase the content of diethylene glycol (DEG) and the concentration of terminal carboxyl groups beyond the appropriate levels and lower the physical properties such as melting point and strength of polyester.

Development of new catalysts has been so far attempted to overcome these problems. Antimony compounds now used most in the industry, particulary antimony trioxide, are distinguished in the cost and effects. However, discoloring of the resulting polyester polymers is inevitable even by using these catalysts. To overcome this disadvantage, a phosphorus-based stabilizer (for example, trimethyl phosphate and triphenyl phosphate) is used together as a stabilizer. In another attempt, an inlet position of the polymerization catalyst or the stabilizer is elaborated to stailize the quality. In the ordinary process, it is preferable to use 200 to 400 ppm of the catalyst and 50 to 200 ppm of the stabilizer.

Figure 2:
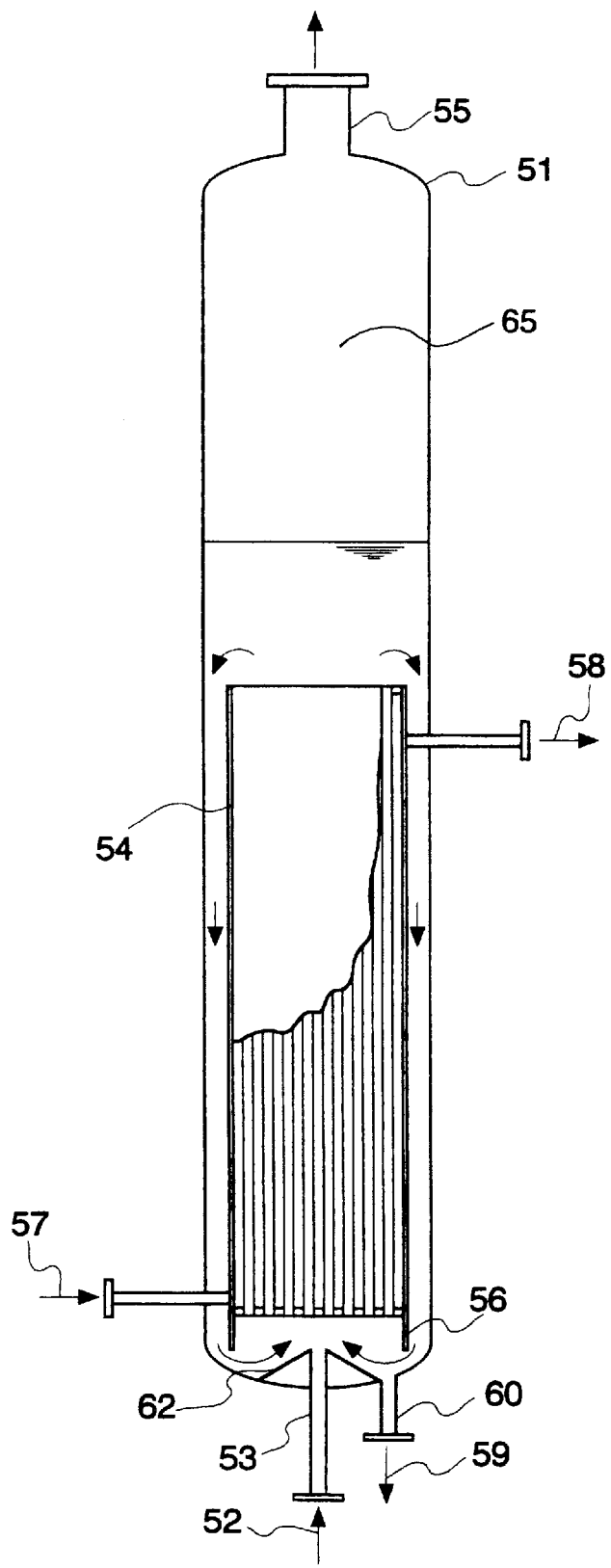
FIG. 2 is a cross-sectional view showing an evaporator according to one embodiment of the present invention.

The raw materials so mixed is led to an esterification reactor 33 as a raw material feed through a fed line 32 supplying the raw material feed thereto. The esterification reactor (first reactor) 33 is provided with a heating medium jacket structure (not shown in the drawing) on the outer periphery of the reactor to keep the raw material feed at a reaction temperature and also provided with a shell-and-tube heat exchange 34 as dipped in the raw material feed within the first reactor as a means of heating the raw mateial feed from an external heat source and circulate the raw material feed within the first reactor by natural circulation, thereby proceeding with the reaction. Type of most desirably first reactor is such a calandria type that the esterification reation is to be carried out by naturally circulating the raw material feed within the reactor on the basis of utilization of the evaporating action of by-products formed by the reaction. This type of reactor needs no external power source for stirring, resulting in such advantagtes an a simple reactor structure, unnecessity for a stirring shaft-sealing device and a low reactor-manufacturing cost. One example of such a desirable first reactor is shown in FIG. 2. FIG. 2 shows one embodiment of the first reactor. Raw mateial feed 52 flows into a vertical evaporator 51 through an inlet 53 provided at the bottom of the evaporator 51 and is heated while passing through a plurality of heat transfer tubes in a shell-and-tube type heat exchange 54 to go upwards by natural convection, where a portion of low boiling point components in the raw material feed 52 is evaporated, and discharged from a vapor pipe 55 to the system outside. The remaining raw material feed 52 flows downwards between the inner wall of the evaporator 51 and the outer wall of the shell of the shell-and-tube type heat exchange 54 by natural convection and enters into a cylindrical entrance space 56 provided at the bottom of the shell-and-tube type heat exchange 54, where the flow of the raw material feed can be rectified to a less turbulent state, and the average flow speed through the tubes of the shell-and-bube heat exchanger 54 is made higher than the average flow speed of the raw material feed flowing downwards by natural convection between the inner wall of the evaporator and the outer wall of the shell. Thus, the raw material feed can enter into a plurality of heat transfer tubes with a more uniform speed distribution and uniformly heated again to repeat circulation by natural convection. In the course of circulation, the low boiling point components are evaporated and after an appropriate convection time, the resulting oligoester or polyester 59 is led to the system outside from an outlet 60. To generate a smooth, accelerated flow, the flow passage area of the cylindrical entrance space must be designed larger than the total flow passage area of heat transfer tubes and also the passage area of double pipe section formed between the inner wall of the evaporator 51 and the outer wall of the shell of the shell-and-tube type heat exchanger 54 is made larger than the flow passage area of the entrance space. Numeral 57 shows an inlet of a heating medium and 58 shows an outlet of the heating medium. The outer periphery of the evaporator 51 is covered with a heat insulator or a heating medium jacket (not shown in the drawing). Thus, in the evaporator of this embodiment, uniform flow speed distribution in the axial direction of the heat exchanger can assure uniform evaporation or esterification reaction of the raw material feed, and a better product quality can be effecttively obtained in a short residence time. In case that the raw material feed 52 is a mixture of solid particles and a liquid (which will be hereinafter referred to as slurry), the raw material feed 52, which undergoes natural circulation, flows into the cylindrical entrance space 56 provided at the bottom of the shell-and-tube type heat exchanger 54, and by more smooth rising along a conical member 62, the solid particles are never precipitated at the bottom. That is, when the liquid is a slurry, solid particles contained in the slurry can be prevented from precipitation by providing at the bottom of the evaporator the conical member for rising the raw mateial feed to undergo internal circulation. The conical member may have some curvature. Thus, the evaporator of this embodiment is effective and more suitale for natural circulation of a slurry, and can produce a reliable polyester product of good quality. The present invention is not limited to this type of evaporator and use of an evaporator with stirring vanes, is not objectionable for process reasons.

In the first reactor, water foumed by the reaction is in a vapor form, and forms a gas phase 65 together with vaporized EG. Recommendable reaction conditions for the first reactor are desirably a temperature from 240° to 285° C. and a pressure of the atmospheric pressure to $3 \times 10^6$ Pa. The gases in the gas phase 65 are separated into water and EG by a rectification column (not shown in the drawing), and water is discharged to the system outside, whereas EG is returned to the system.

Advantages of the present invention are such that only a single rectification column is satisfactory, because the esterification step is carried out in a single reactor, and thus not only the rectification column manufacturing cost but also number of piping, valves, control units, etc. can be reduced, resulting in a large reduction of apparatus cost.

In FIG. 1, the raw material feed, when retained in the esterification reactor 33 (first reactor) for a predetermined reaction time reaches a predermined rate of esterifcation to produce an oligoester or polyester having an average degree of polymerization of 3 to 7 and then the resulting oligoester or polyester is supplied to an initial polymerization reactor (second reactor) 37 through a connecting pipe 36, where the oligoester or polyester feed is heated to a predetermined reaction temperature by a heat exchanger 38 to undergo polycondensation reaction, thereby increasing the average degree of polymerization. The reaction conditions are a temperature of 250° to 290° C. and a pressure of the atmospheric pressure to 133 Pa, preferably 266 Pa to 133 Pa, whereby the polycondensation reaction is made to proceed to produce a low molecular weight polyester having an average degree of polymerization of 20 to 40. The initial polymerization reactor shown in this embodiment is a reactor without stirring vanes, but the present invention is not limited to such a reactor. The initial polymerization stage is such that kinetics of polymerization reaction is ratedetermining and thus the reaction can proceed smoothly only by supplying the necessary quantity of heet for the polycondensation reaction fully. Thus, there is no need for the oligoester or polyester feed to unnecessitate the stirring action by stirrng vanes and it is only necessary to discharge EG formed by the polycondensation to the system outside. Most suitable second reactor for such an operation is desirably an apparatus shown in FIG. 3.

Figure 3:
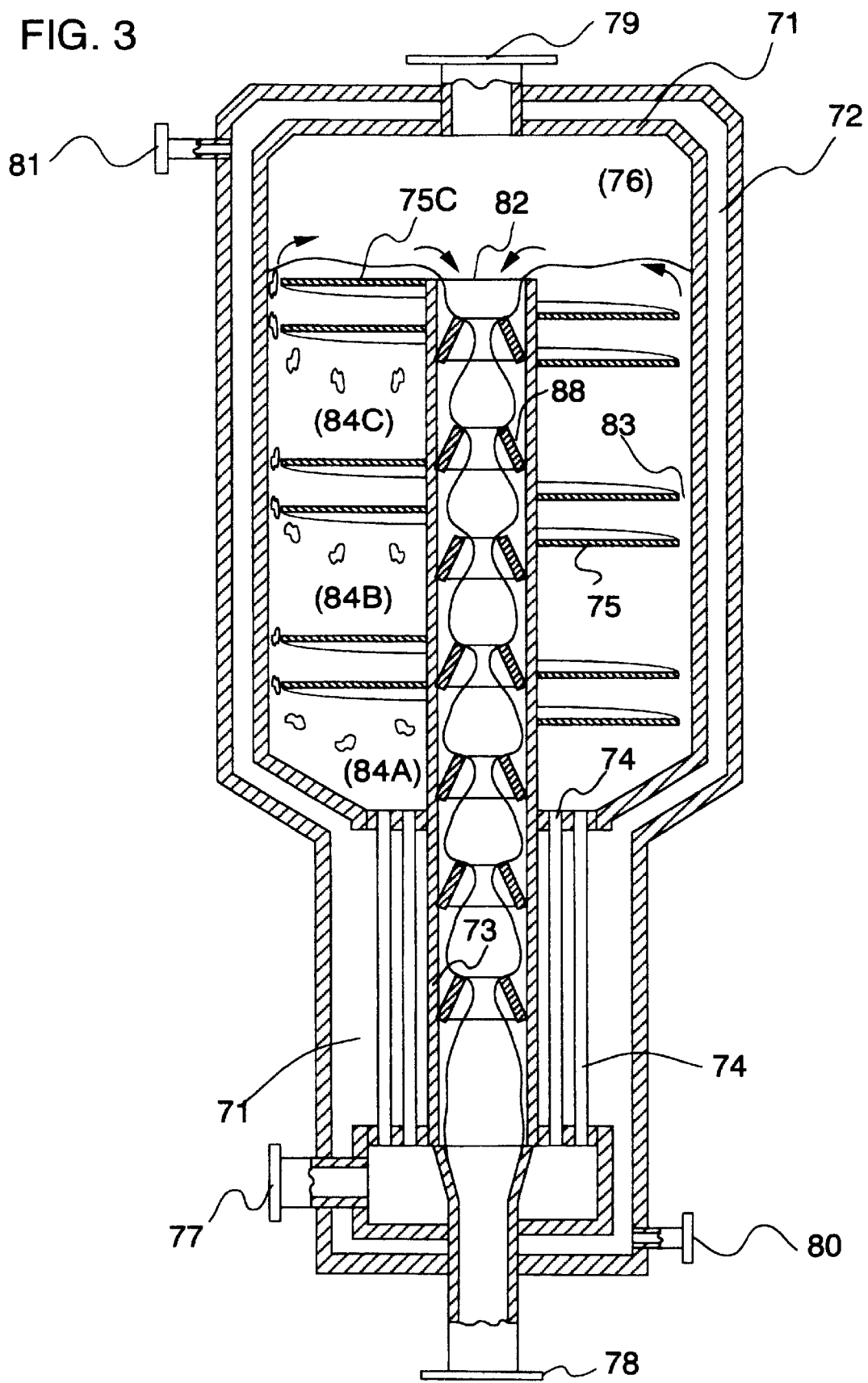
FIG. 3 is a vertical cross-sectional front view showing one embodiment of the present invention.

In FIG. 3, numeral 71 is a vertically long, cylindrical vessel whose outer periphery is covered by a heating medium jacket 72 having an inlet 80 for a heating medium and an outlet 81 for the heating medium, and a down pipe 73 having an open top end is provided in the longitudinal direction at the center of the vessel 71. A plurality of heat transfer tubes 74 are provided at the lower part within the vessel 71 in parallel to the down pipe 73. A plurality of helical baffle plates 75 are provided on given different levels on the outer periphery of the down pipe 73 above the heat transfer tube 74. The baffle plates 75 each have a clearance 83 between its edge and the inner wall of the vessel 71 to allow volatile matters to pass therethrough and partitions the interior of the vessel 71 in the vertical direction to form a plurality of residence compartments 84. There is a space 76 for separating the liquid feed from volatile matters at the upper part of the vessel 71, that is, above the down pipe 73 and the uppermost baffle plate 75C. A plurality of tapered liquid receivers 88 are provided on given different levels on the inner wall of the down pipe 73, through which the oligoester or polyester feed flows downwards as a thin film. The oligoester or polyester feed flowing downwards through the down pipe 73 can be retained once in the individual liquid receivers and then successively move downwards, and thus the polycondensation reaction can proceed, while minimizing the oligopolymer or polyester feed short path and effectively separating the vapors of volatile matters.

In the second reactor, the oligoester or polyester feed continuously supplied through an inlet nozzle 77 enters into heat transfer tubes 74 and rises therethrough while being heated and reaches the lowermost residence chanber 84A. While the feed slowly rises through the residence compartment 84A, polycondensation reaction proceeds and the resulting volatile matters such as ethylene glycol, etc. move upwards through the clearances 83 at the outer edge of the baffle plate 75. On the other hand, the feed rises along the helical configuration of the baffle plate 75 in a whirling stream in the residence compartment 84A and enters into next upper residence compartment 84B. Since the feed can move smoothly in a whirling stream into the next upper residence compartment 84B, the feed can rise successively through other upper residence compartment without causing any backflow, and thus the polycondensation reaction proceeds effectively.

The feed, which has reached the uppermost residence compartment 84C, flows over the top edge 82 of the down pipe 73 and flows downwards along the inner periphery of the down pipe 73 as a thin film, while separating vapors of volatile matters resulting from the reaction, and thus the polycondensation reaction can further proceed. The feed at an advanced stage of polycondensation reaction, which has been separated from vapors of volatile matters resulting from the reaction, is dischaarged to the system outside through an outlet nozzle 78, while the resulting volatile matters are separated from entrainments of the feed (polyester) in an upper space 76 in the vessel 71 and discharged to the system outside through an outlet nozzle 79 for the volatile matters.

At that time, the volatile matters are liable to entrain the feed (polyesters), that is, an entrainment problem is liable to occurs. In the present invention, the feed and volatile matters that bump upwards can be shifted towards the circumferential direction by the helical buffle plates 75 to suppress the entrainments. The volatile matters generated in the second reactor, that is, EG, are vaporized in the upper space (gas phase section) 76 kept in a reduced pressure atmosphere and discharged to the system outside after condensation through a condenser (not shown in the drawing) provided at the overhead of the vessel 71.

Advantages of the present invention are such that only a single condenser is satisfactory, because the initial polymerization step is carried out in a single reactor, and thus not only the condenser manufacturing cost but also number of pipings, valves, control devices, etc. can be reduced, resulting in a large reduction of apparatus cost.

Figure 4:
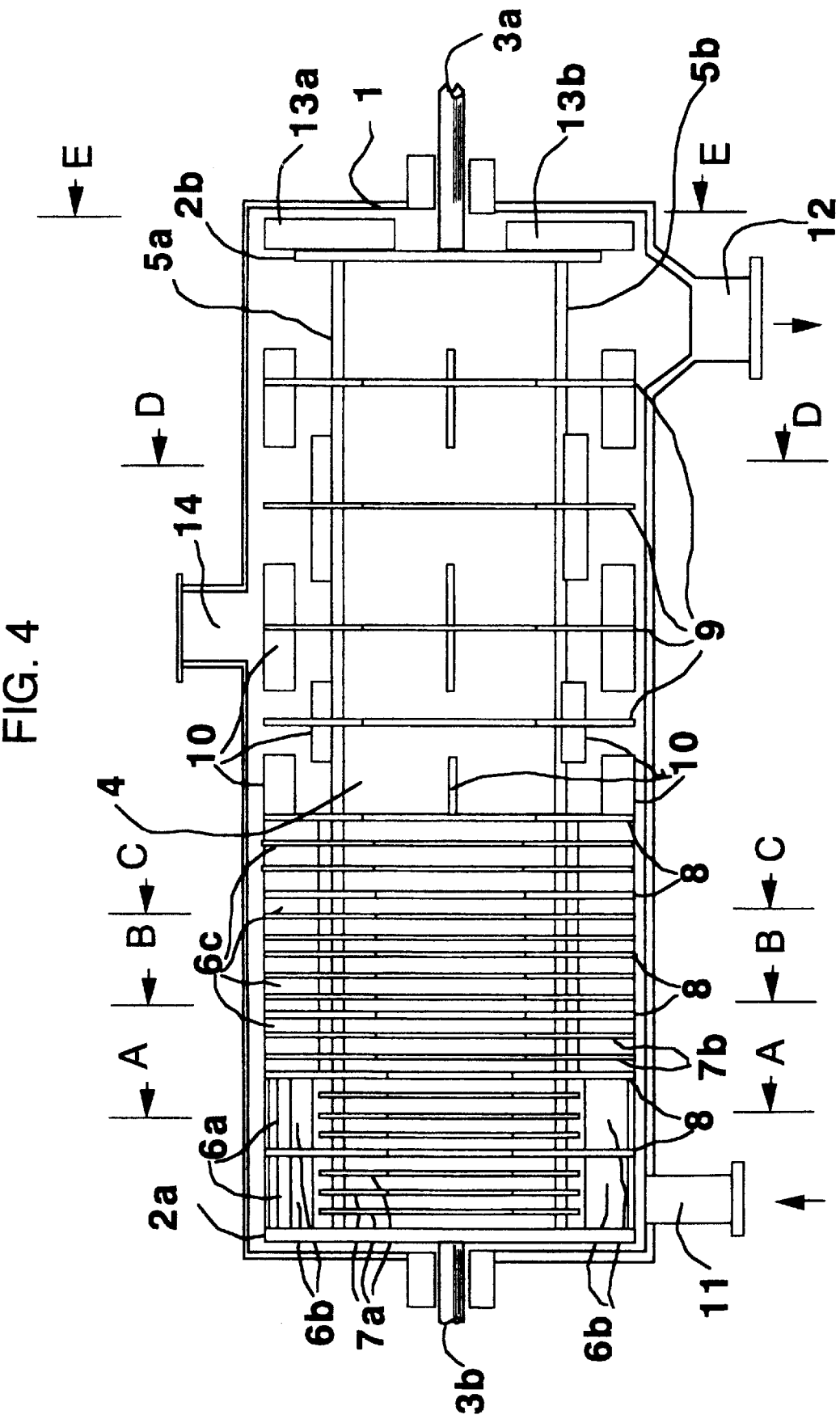
FIG. 4 is a vertical cross-sectional front view showing one embodiment of the present invention.
Figure 15:
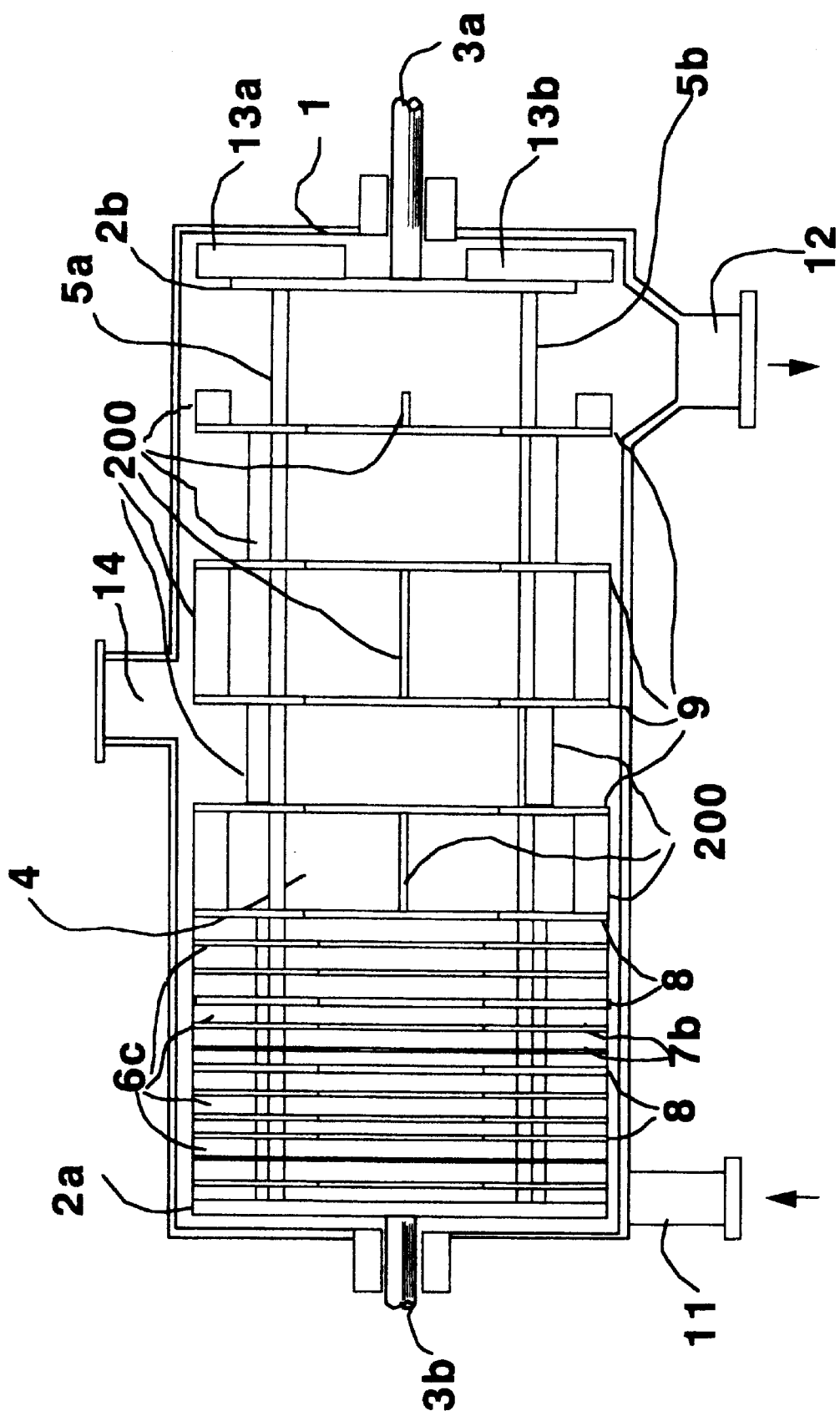
FIG. 15 is a vertical cross-sectional front view showing another embodiment of the present invention.

In FIG. 1, the feed retained in the initial polymerization reactor (second reactor) 37 for a predetermined reaction time is supplied to a final polymerizer (third reactor) 41 through a connecting pipe 40. In the final polymerizer the polycondensation reaction further proceeds under a good surface renewal action of stirring vanes 42 without a stirring shaft at the center to elevate the degree of polymerization, whereby a high molecular weight polyester having an average degree of polymerization of 90 to 180 is produced. Suitable final polymerizer (third reactor) is shown in FIGS. 4 and 15, which have most distingnished surface renewal performance and power consumption characteristics. Owing to a broad viscosity range of the liquid feed, the conventional final polymerizer is divided into two apparatuses to conduct the final polymerization step, whereas in the present invention the step can be carried out in a single apparatus, resulting in large reduction in the apparatus cost.

In FIG. 1, numerals 35 and 39 in the first reactor 33 and the second reactor 37 show a liquid-gas phases, respectively, and numeral 44 in the third reactor is a driving means to the stirring rotor. The present final polymerizer will be described be low, referring to FIG. 4, which shows a vertical cross-sectional front view of the present apparatus.

Figure 5:
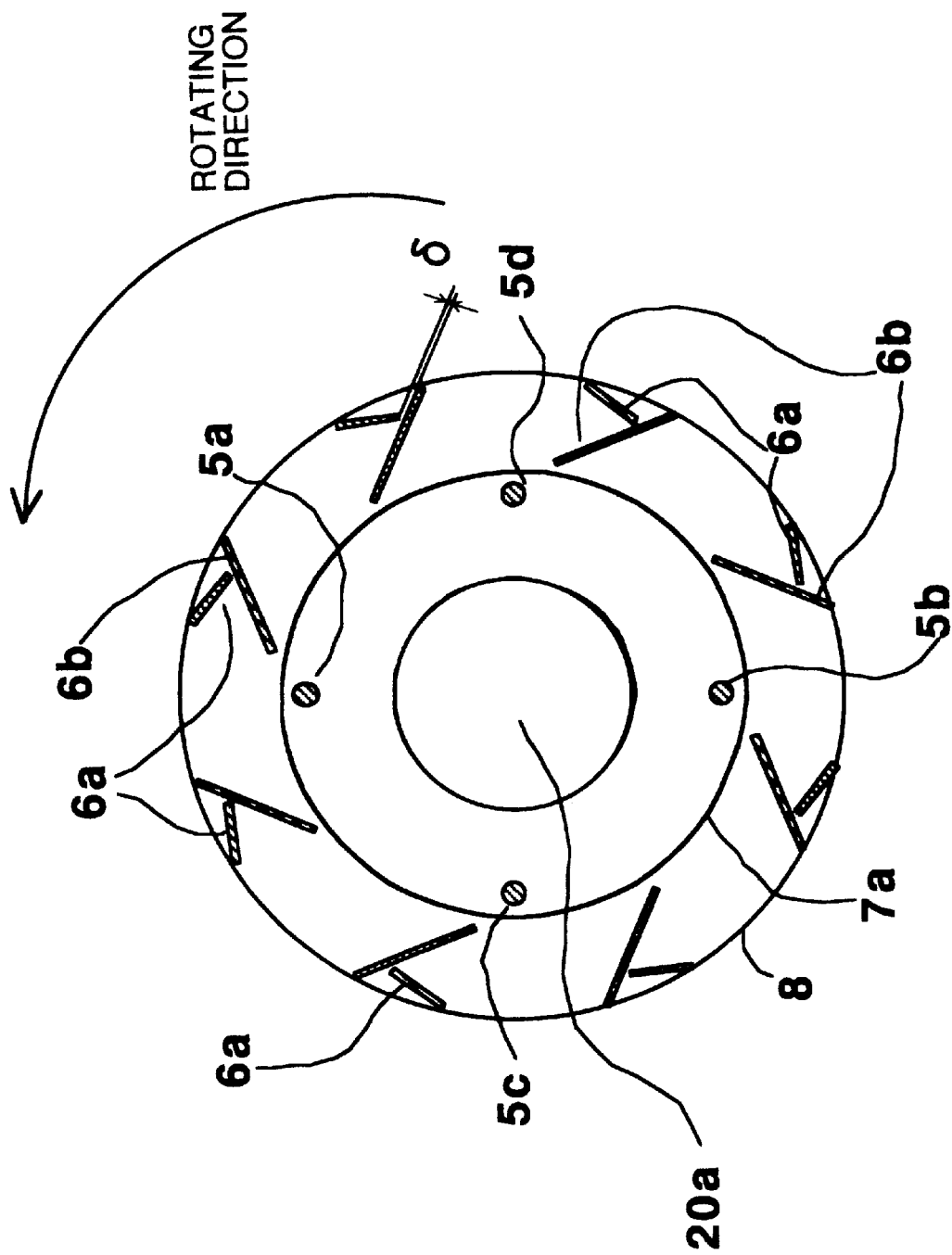
FIG. 5 is a cross-sectional view along the line A—A of FIG. 4.

In FIG. 4, numeral 1 shows a horizontally long cylindrical vessel, whose outer periphery is covered with a heating medium jacket (not shown in the drawing), and at whose both ends in the longitudinal direction are provided shafts 3a and 3b for rotor support, respectively. A stirring rotor 4 is fixed to and supported between the shafts 3a and 3b for the rotor support, and the rotor shaft 3a is connected to a driving means (not shown in FIG. 4, but shown as 44 in FIG. 1), and has rotor support members 2a and 2b connected to connecting support rods 5a, 5b, 5c and 5d, as shown in FIGS. 4 and 5 (the number of connecting support rods depends on the size of the stirring rotor 4 but is 4 in this embodiment) at both ends of the stirring rotor 4. The stirring rotor 4 has a plurality of stirring blocks between the support members (end disks) 2a and 2b. The support member 2a is a member for a low viscosity polyester feed and the support member 2b for a high viscosity polyester feed. The support member 2b is smaller in the outer diameter than the stirring rotor 4 and has scraping vanes 13a and 13b on the vessel end-focing side to forward the high molecular weight polyester staying on the inner wall of the vessel 1 towards the product outlet of the vessel 1 by rotation of the stirring rotor 4. Its detail structure is shown in FIG. 14, which is a cross-sectional view along the line E—E of FIG. 4. In the low viscosity zone of the stirring rotor 4 in the vicinity of an inlet nozzle 11 is provided a plurality of low viscosity stirring blocks, each of which comprises a pair of hollow disks 8 with backets formed by scraping vanes 6a and 6b and thin hollow disks 7a provided between a pair of the hollow disks 8 and being subject to the low molecular weight polyester feed pouring from the backets (its detailed structure will be described referring to FIGS. 5, 9 and 10). In the intermediate viscosity zone is provided a plurality of intermediate viscosity stirring blocks, each of which comprises a pair of hollow disks 8, a plurality of thin hollow disks 7b having the same outer diameter at equal distances between the pair of hollow disks 8 and a plurality of scraping vanes 6c provided radially at the outer peripheral side of these disks (its detailed structure will be described, referring to FIGS. 6, 7, 11 and 12). Furthermore, a high viscosity stirring block, which comprises a plurality of wheel-type disks 9 provided at appropriate distances from one another and scraping vanes 10 provided at the outer peripheral side of the wheel-like disks 9, is provided at the outlet side of the vessel 1 (its detailed structure will be described, referring to FIGS. 3 and 13). An outlet nozzle 12 for discharging the high molecular weight polyester product (final polymers) is provided at the lower part at the other end of the vessel 1, and an outlet nozzle 14 for the volatile matters is provided on the upper part of the vessel 1 and is connected to a condenser and a vacuum means through a piping (not shown in the drawings).

Figure 9:
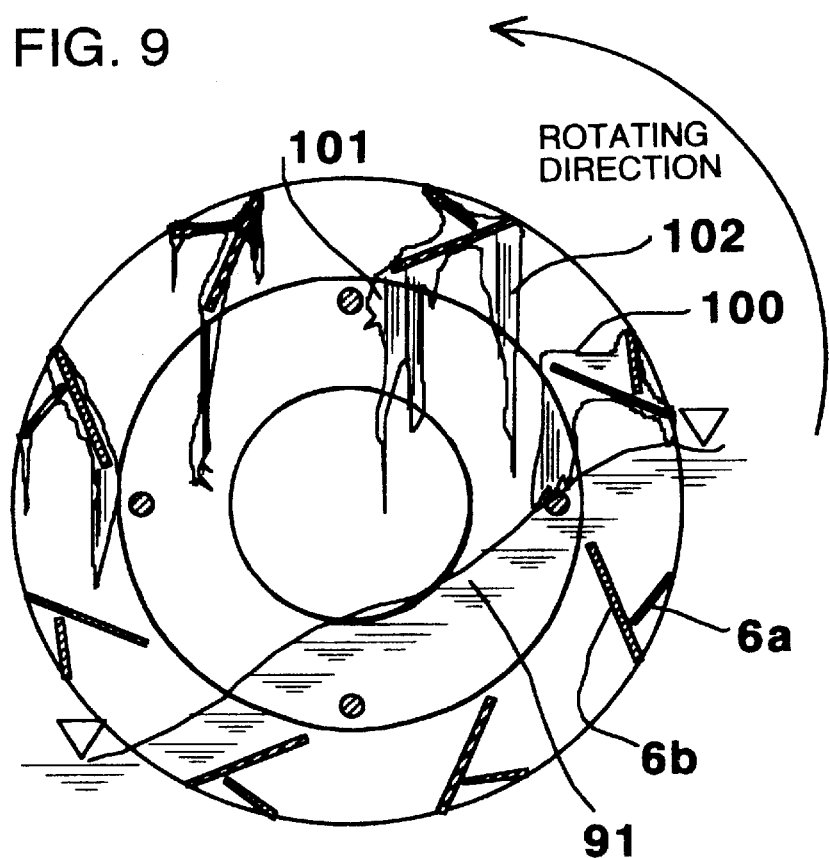
FIG. 9 is a schematic view showing the flow of a polyester feed in backets in a low viscosity stirring block.
Figure 10:
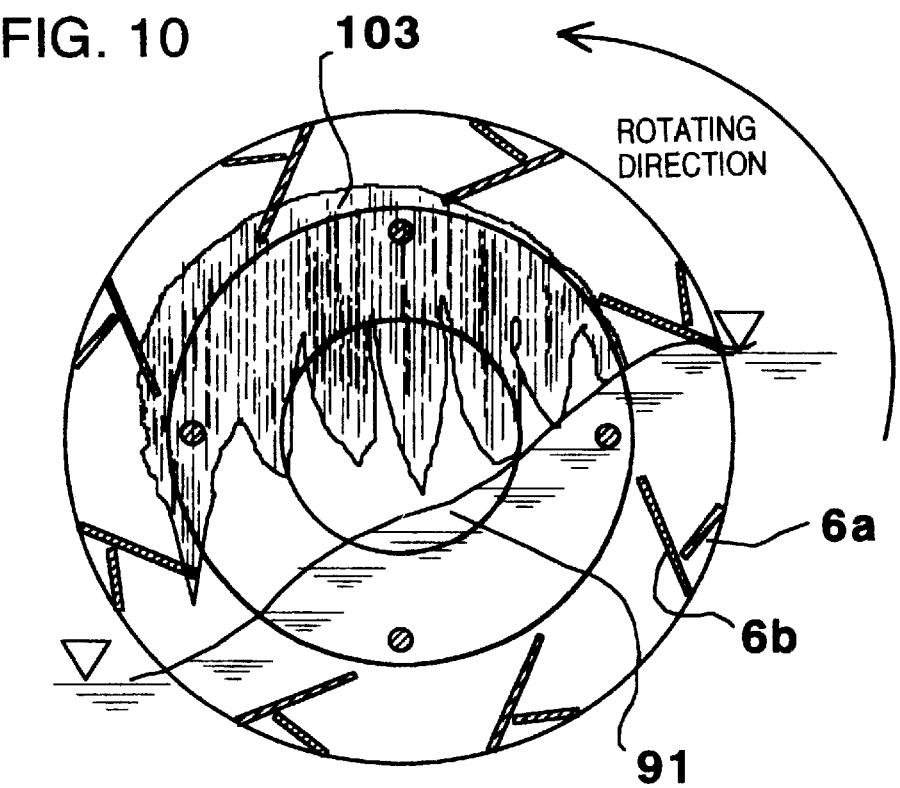
FIG. 10 is a schematic view showing the flow of a liquid feed around the thin hollow disk in a low viscosity stirring block.

In the final polymerizer as shown in FIG. 4, a low viscosity low molecular weight polyester (prepolymer) feed having a low degree of polymerization, e.g. an average degree of polymerization of 20 to 40, continuously fed through the inlet nozzle 11 is at first stirred in a plurality of the low viscosity stirring blocks by backets on the hollow disks shown in FIG. 5. At that time, the feed has such a low viscosity as a few Pas to a few tens Pas. In the low viscosity stirring blocks, one pair of the scraping vanes 6a and 6b forms one backet at the outer peripheral side of the hollow disk 8, as shown in FIG. 5, so as to scoop up the feed into the backet by rotation as shown in FIG. 9. That is, FIGS. 9 and 10 schematically show feed-flowing states. At the bottom of each basket of the scraping vanes 6a and 6b is formed a small hole or clearance δ. With rotation of the stirring rotor, low viscosity feed 91 is scooped up by the backet, as shown by numeral 100 in FIG. 9, and the backets are further inclined downwards by further rotation to allow the feed to start to leave the inwardly, and at the same time to start to leak out outwardly little by little from the backet through the small hole on clearance, as shown by numeral 102 in FIG. 9, to form inward and outward liquid films 101 and 102, respectively, from the backet. The feed 101 flowing downwards inwardly from the backet pours onto the thin hollow disk 7a provided in the vicinity of the tip end at the inward side of the backets, as shown by numeral 103 in FIG. 10, to form liquid films on the surface of each of the thin hollow disk 7a and between the adjacent thin hollow disks 7a at the same time, thereby producing a larger evaporation surface area. These actions are repeated by each rotation of baskets to assure a sufficient evaporation surface area and a better surface renewal. Satisfactory better performance can be obtained in the low viscosity stirring blocks even at a low revolution per minutes such as 0.5 rpm to a few rpm (not more than 10 rpm), and effective reduction of stirring power consumption can be obtained. By-products evaporated from the feed pass through center holes 20a of the hollow disks 8 and center holes of thin hollow disks 7a and give off through the outlet nozzle 14.

Figure 6:
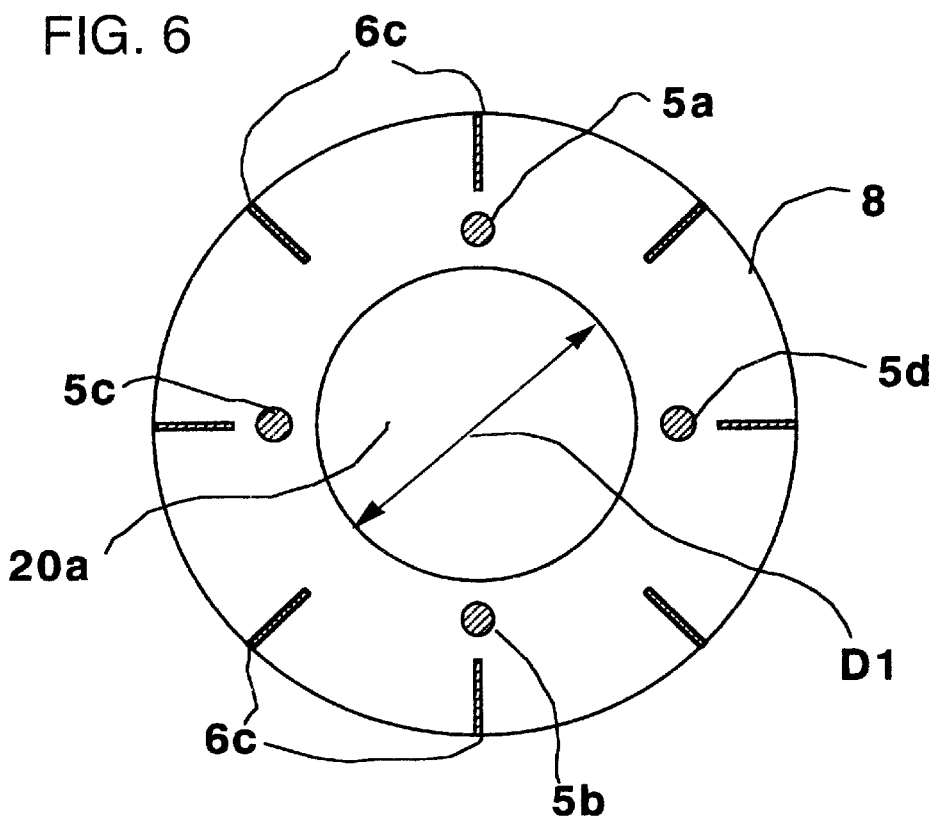
FIG. 6 is a cross-sectional view along the line B—B of FIG. 4.
Figure 7:
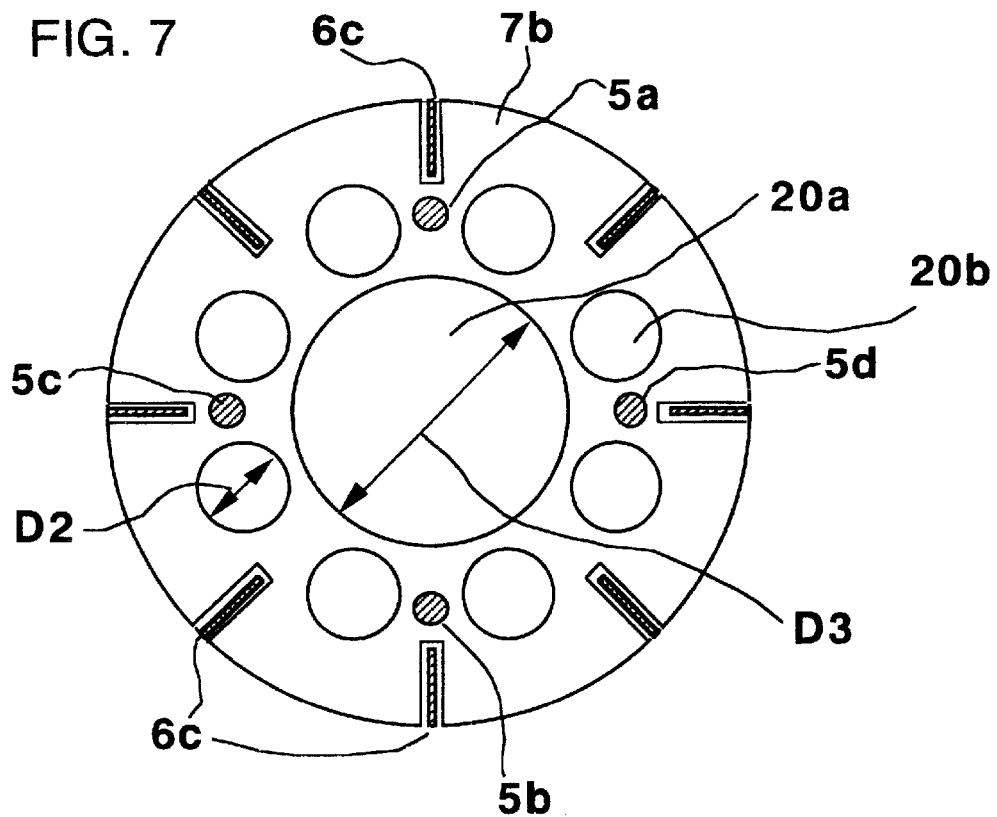
FIG. 7 is a cross-sectional view along the line C—C of FIG. 4.

The feed treated in the low viscosity stirring blocks for a predetermined residence time has an increased viscosity such as a few tens Pas, and enters into a plurality of the adjacent intermediate viscosity stirring blocks, whose detailed structure is shown in FIGS. 6 and 7. The intermediate viscosity stirring blocks each comprises a pair of hollow disks 8, a plurality of thin hollow disks 7b provided therebetween and scraping vanes 6c provided throughout on the peripheral sides of these hollow disks 8 and 7b. Diameter D1 of center hole 20a of the hollow disk 8 as in FIG. 6 and diameter D3 of a center hole 20a of the thin hollow disk 7b as in FIG. 7 are selected to be optimum, depending on the vapor flow rate of by-products evolved from the feed by the further polycondensation reaction. Furthermore, diameter D2 of small circular holes 20b of the thin hollow disk 7b as shown in FIG. 7 is selected to be optimum, depending on the viscosity of the feed and the vapor flow rate of the by-products evolved from the feed by the polycondensation reaction.

Figure 11:
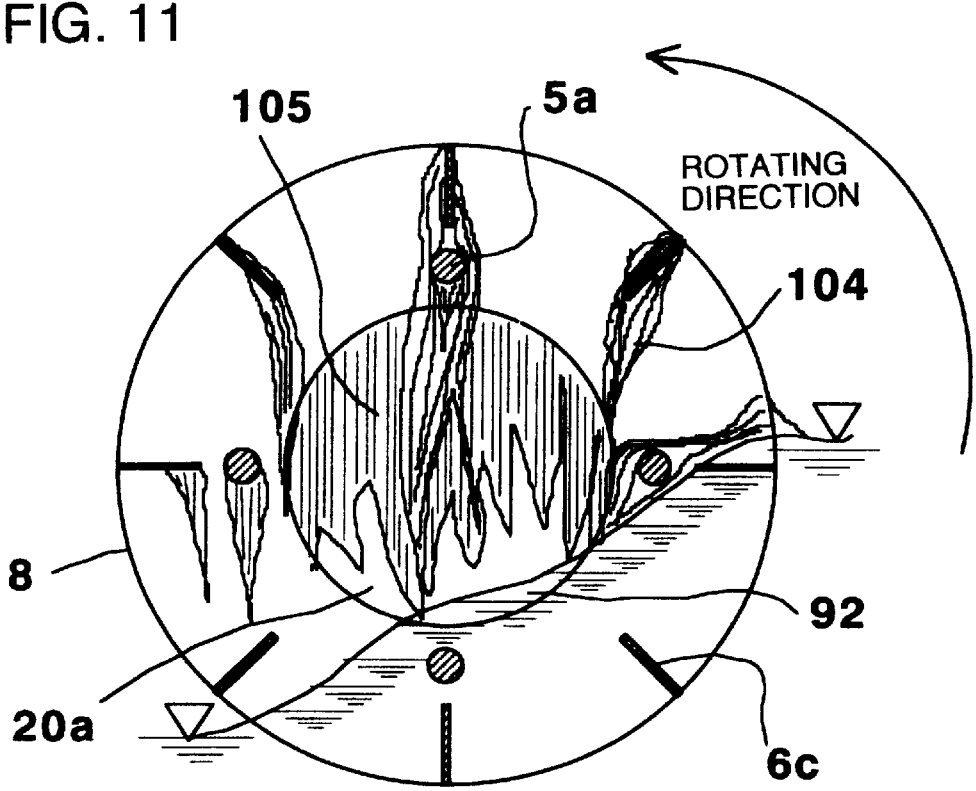
FIG. 11 is a schematic view showing the flow of a polyester feed around the hollow disk in an intermediate viscosity stirring block.
Figure 12:
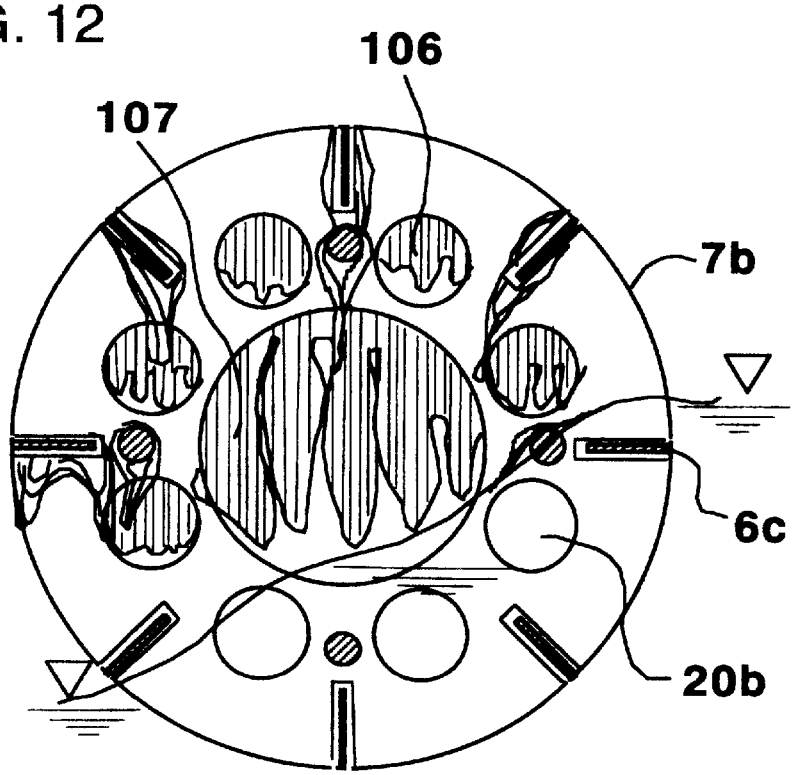
FIG. 12 is a schematic view showing the flow of a polyester feed on the thin hollow disk in an intermediate viscosity stirring block.

The feed 92 having an increased viscosity such as a few tens Pas is brought upwards by the scraping vanes 6c by rotation, and flows downwards by grodual inclination of the scraping vanes 6c by further rotation thereof to form liquid films 104, as shown in FIG. 11. The liquid films 104 flow down onto the connecting support rods 5a of the stirring rotor 4 and are retained there for a long time as sticked thereto suspendewd down therefrom, and furthermore the feed so brought upwards are suspended downweards over the center hole 20a of the hollow disk 8 to form a liquid film 105, as shown in FIG. 11. A liquid film 107 is likewise formed over the center hole 20a of the thin hollow disk 7b and also the feed is suspended down over the small circular holes 20b of the thin hollow disk 7b to form liquid films 106, as shown in FIG. 12. The feed is formed into such liquid films and can have much increased degree of polymerization and viscosity due to much incrreased evaporation surface area and surface renewal.

Figure 8:
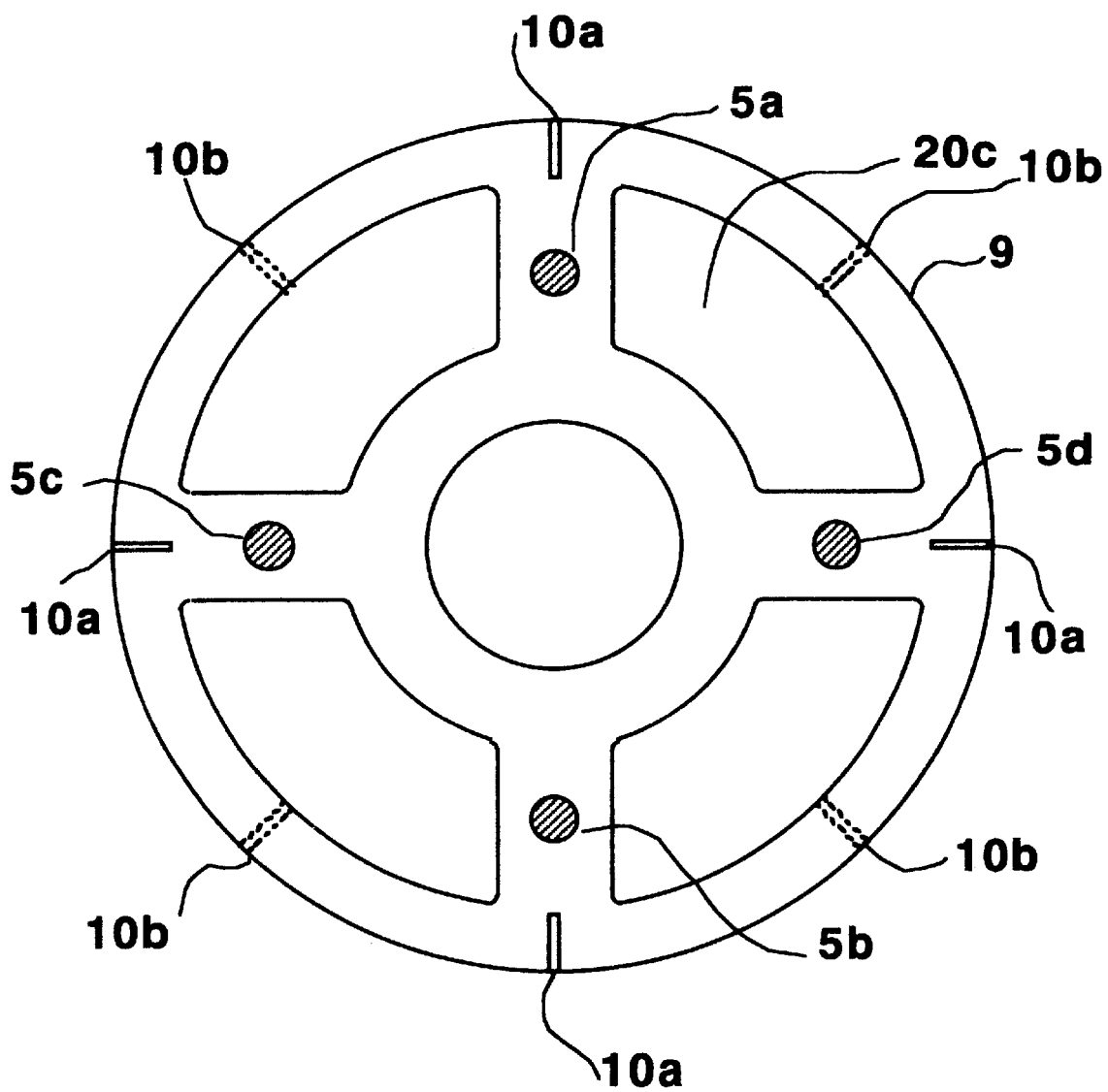
FIG. 8 is a cross-sectional view along the line D—D of FIG. 4.

When the viscosity of the feed reaches a few hundred Pas, the feed is treated in a high viscosity stirring block. The high viscosity stirring block comprises a plurality of wheel type disks 9 having scraping vanes 10 (FIG. 4) at the outer peripheral side thereof, as shown in FIG. 8. The wheel type disks 9 are connected to one another at predetermined distances by the connecting support rods 5a, 5b, 5c and 5d in the horizontal direction. The scraping vanes 10 comprise front side vanes 10a and back side scraping vanes 10b alternately arranged on one wheel type disk 9 and on another adjacent wheel type disk 9, respectively, so that the total lenghth in the herizontal direction of the scraping vanes on all the wheel type disks 9 is such that the track of one scraping vane 10a on one wheel bype disk can overlap that of one scraping vane 10b on another wheel type disk, when rotated, to scrape the corresponding entire inner wall surface of the vessel 1.

Figure 13:
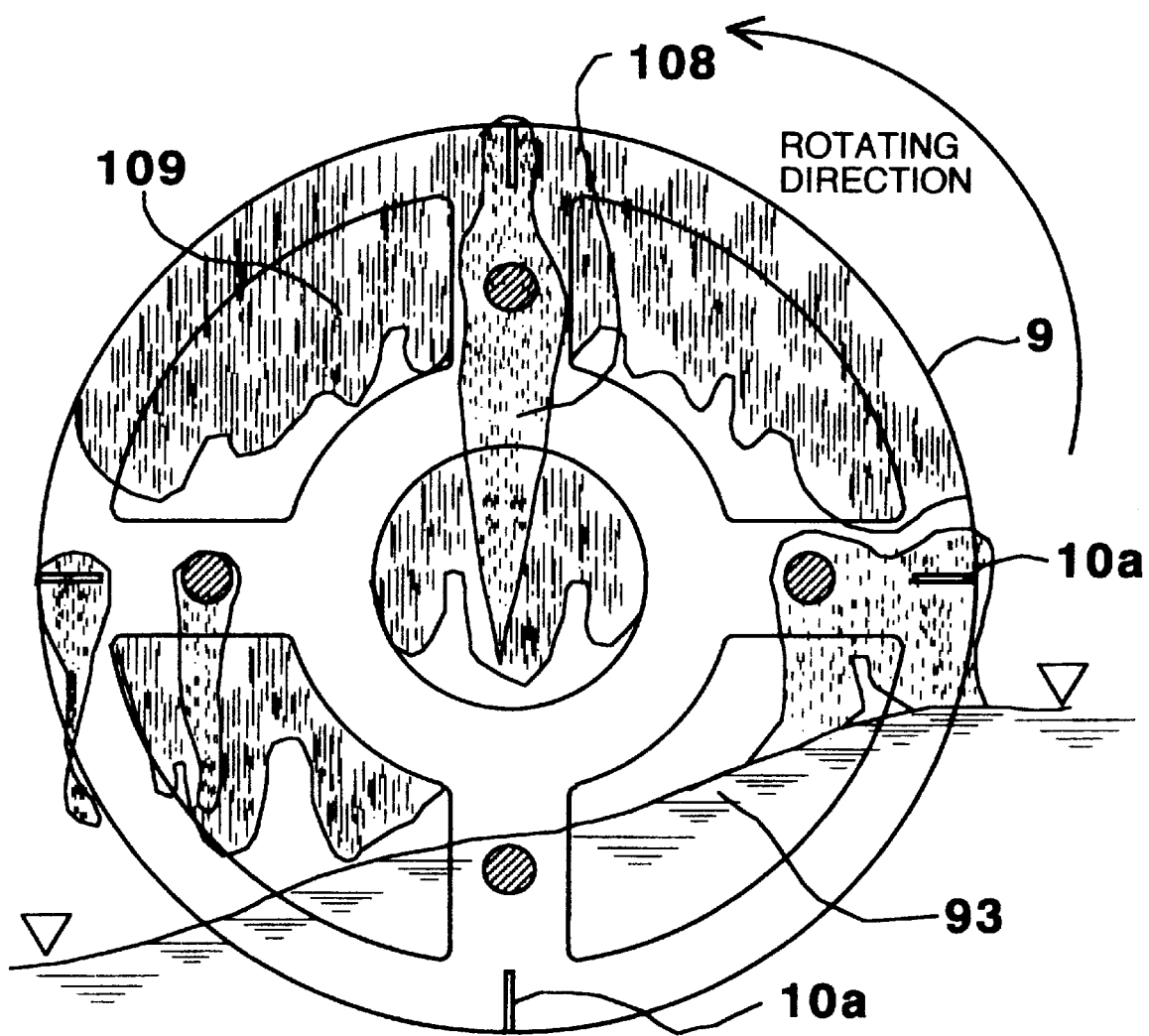
FIG. 13 is a schematic view showing the flow of a polyester feed in a high viscosity stirring block.
Figure 14:
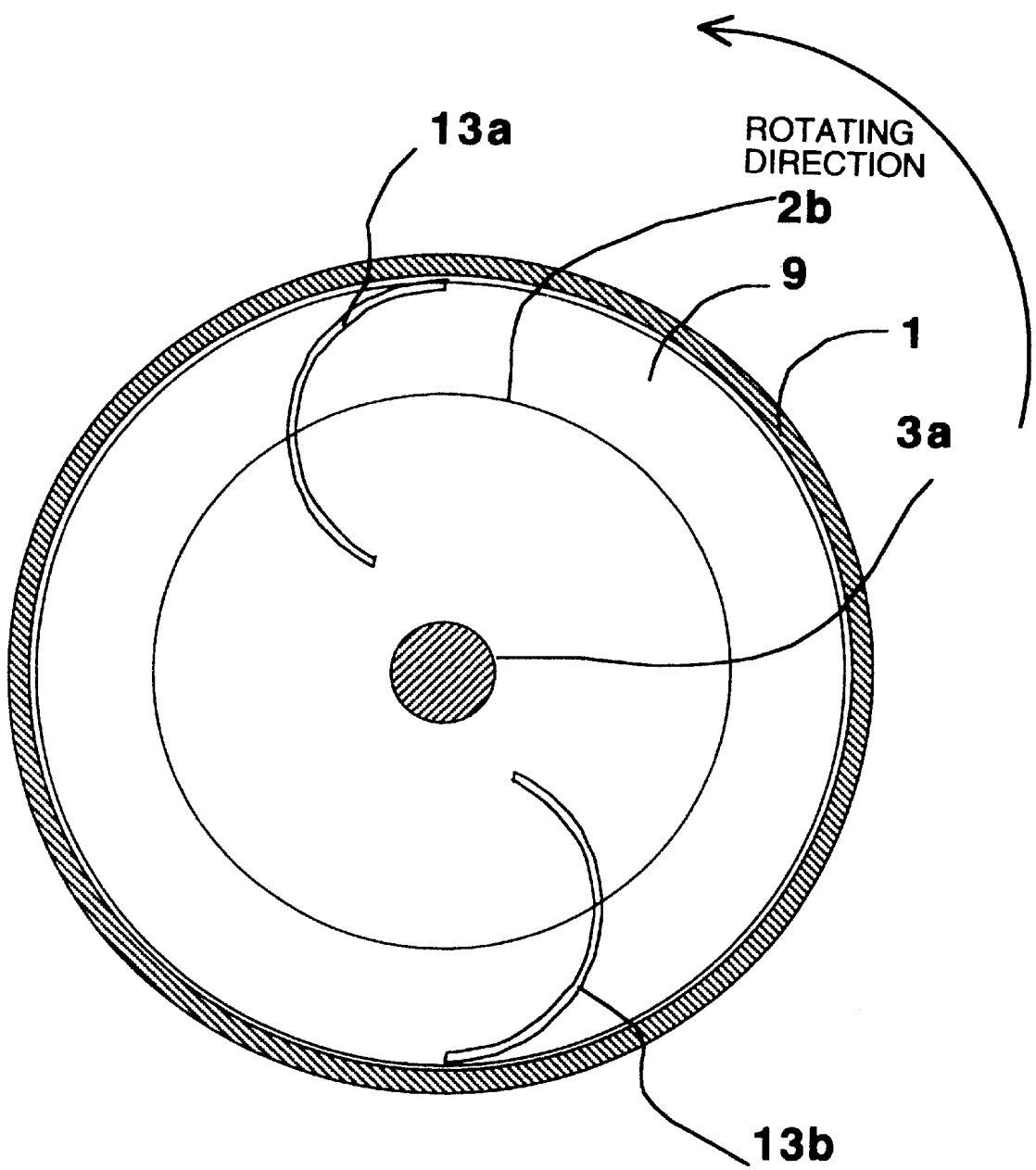
FIG. 14 is a cross-sectional view along the line E—E of FIG. 4.

As shown in FIG. 13, the feed 93 having a viscosity of a few hundred Pas is brought upwards by the scraping vanes 10a by rotation of the stirring rotor 4, and the feed so brought upwards flows downwards by rotation of the whese type disk 9 and suspended to form a liquid film 108, and furthermore a liquid film 109 is formed also over the hollow parts of the wheel type disk 9, thereby creating complicated surface shapes of liquid films. When the viscosity of the liquid feed is further increased to reach a few throusand Pas, the amount of the feed so brought upwards by the scraping vanes 10a is increased. When the revolution per minute of stirring rotor 4 is increased in that state, such a retained feed-circulating phenomenon as to bring upwards the feed retained by the scraping vanes 10a again without leaving the vanes occurs. Thus, the stirring rotor 4 must be rotated at not more than 10 rpm. When the viscosity of the liquid feed becomes higher, the optimum rotation must be made slower. According to the inventors' test, the optimum rotation is in a range of 0.5 to 6 rpm. Stirring and surface renewal actions are repeated, as described above, to promote polycondensation reaction. Votalite matters formed by the reaction pass through the hollow arts, center holes and small holes of the hollow disks successively and move in the longitudinal direction through the vessel 1 and discharged to the system outside through the outlet nozzle 14 for the volatile matters. The resulting final high molecular weight polyester having a high degree of polymerization such as an average degree of polymerization of 90 to 180 and a high viscosity such as a few thousand Pas so obtained is discharged to the system outside through the outlet nozzle 12. At that time the final polyester having such a high viscosity is liable to stay in the region above the outlet nozzle 12, but the outer diameter of the support member 2b of the stirring rotor 4 is smaller than the outer diameter of the stirring rotor 4, the final polyester never stays on the support member 2b. Furthermore, the scrapimg vanes 13a and 13b are provided on the support member 2b on the vessel inner end wall-facing side, as shown in FIGS. 4 and 14 to, forward the final polyester therefrom towards the outlet 12 of the vellel 1, and thus the inner end wall surface of the vessel is kept always in a substantially complete self-cleaned state to prevent the final polyester from the deposition and staying thereon.

In the polycondensation of polyethylene terephthalate in such a final polymerizer, a prepolymer feed from the second reactor is continuously supplied into the final polymerizer (third reactor) through the inlet nozzle 11, strirred by the stirring rotor 4, while renewing the prepolymer feed surfaces, and evaporating and removing volatile matters resulting from the polycondensation reaction such as ethylene glycol, etc. and as a result of the polycondensation reaction final polyester of a higher viscosity can be obtained. Volatile matters separated during the polycondensation reaction, for example, ethylene glycol, etc. are discharged to the system outside through the outlet nozzle 14. Operating conditions for the final polymerizer are a temperature of 260° to 300° C., preferably 270° to 290° C., a pressure of 10,000 to 10 Pa, preferably 200 to 13.3 Pa and a stirring rotor revolution of 1 to 10 rpm. The resulting final polymers are discharged to the system outside through the outlet nozzle 12. The interior of the vessel 1 is stirred and kept always in a substantially complete self-cleaned state during the polycondensation reaction and the feed is subject to better surface renewal, and thus final polyester of good quality can be efficiently obtained without any deterioration due to the staying in the vessel 1. This type of the present final polymerizer can be likewise applied to continuous bulk polymerization of resins of polycondensation series such as polyethylene naphthalate, polyamide, polycarbonate, etc.

If the viscosity of the feed to be supplied to the final polymerizer is relatively high, no such low viscosity stirring blocks can be used. That is, the low viscosity stirring blocks can be omitted, from the final polymerizer as shown in FIG. 4. FIG. 15 shows one embodiment of such a final polymerizer, which is identical in the structure with that of FIG. 4 except that the low viscosity stirring blocks are omitted from that of FIG. 4. In FIG. 15, the high viscosity stirring block comprises a plurality of wheel type disks 9 provided at appropriate distances from one another, scraping vanes 200 being provided as connected between the outer peripheral sides of a pair of adjacent wheel type disks 9 but the position of scraping vanes 200 at one pair of the adjacent wheel type disks 9 is alternated with that at another pair of the next adjacent wheel type disks 9.

In the above-mentioned apparatus structure for poducing polyethylene terephthalate, number of reactors is decreased, as compared with the conventional apparatus structure and thus the apparatus cost can be much reduced in the present invention.

Not only number of accessary distillation or rectification columns and condensers can be decreased due to the decreased number of reactors but also pipings connecting thereto, instrumentation or control devices and values can be largely saved. Utility costs relating to a vacuum means and a heading medium facility can be also largely lowered, resulting in a lower running cost as an advantage.

According to the present invention, an apparatus for continuously producing polyester can be made only from 3 reactors, each directed to the esterification step, the prepolymerization step and the final polymerization step, and can be operated economically due to an increased efficiency throughout the apparatus and energy saving throughout the plant facility. Total reaction time throughout the first reactor, second reactor and third reactor is 4 to 8 hours.

What is claimed is:

1. A process for continuously producing polyester by means of a first reactor for reacting an aromatic dicarboxylic acid or its derivative with a glycol, thereby producing an oligoester or a polyester having an average degree of polymerization of 3 to 7, a second reactor for polycondensing the product, thereby producing a low molecular weight polymer having an average degree of polymerization of 20 to 40 and a third reactor for further polycondensing the low molecular weight polymer to an average degree of polymerization of 90 to 180, thereby producing a high molecular weight polyester, wherein a reactor for continuously producing polyester, which comprises a substantially vertical cylindrical vessel provided with an inlet and an outlet for a liquid feed, respectively, at the lower side part thereof and at the bottom at the center thereof in the longitudinal direction thereof, an outlet for volatile matters at the top thereof, a heating medium jacket around the outer periphery of the vessel body, a heat exchange section at the lower part thereof within the vessel, a residence section with helical baffer plates at the intermediate position thereof within the vessel for retaining and successively transforming the liquid feed from the above downwards, a space for gas-liquid separation at the upper position thereof within the vessel, and a down pipe at the center in the vertical direction of the vessel for flowing down the liquid feed as a thin film therethrough, is used as the second reactor.

2. A process for continuously producing polyester by means of a first reactor for reacting an aromatic dicarboxylic acid or its derivative with a glycol, thereby producing an oligoester or a polyester having an average degree of polymerization of 3 to 7, a second reactor for polycondensing the product, thereby producing a low molecular weight polymer having an average degree of polymerization of 20 to 40 and a third reactor for further polycondensing the low molecular weight polymer to an average degree of polymerization of 90 to 180, thereby producing a high molecular weight polyester, wherein a reactor for continuously producing polyester, which comprises a substantially horizontal cylindrical vessel provided with an inlet and an outlet for a liquid feed, respectively, at the lower part at one end thereof and at the lower-part at the other end thereof in the longitudinal direction thereof, an outlet for volatile matter at the upper part thereof, and a stirring rotor provided with a plurality of hollow disks as connected to one another in the longitudinal direction thereof within the cylindrical vessel, and further provided with scraping plates each between the adjacent hollow disks for scraping the liquid feed attached to the inside wall of the vessel, the stirring rotor being without any rotating shaft at the position of rotating center axis, the stirring rotor comprising a plurality of stirring blocks depending on the viscosity level between the inlet and the outlet, the distance between the adjacent hollow disks being larger at the one end in the longitudinal direction of the vessel than at the other end, the inner diameter of the hollow disks being larger at the one end in the longitudinal direction of the vessel than at the other end, and the scraping plate at the other end being discrete between the adjacent hollow disks, is used as the third reactor.

3. A process for continuously producing polyester according to any one of claims 1 to 2, wherein the first reactor is provided with a mixture of the aromatic dicarboxylic acid or its derivative and the glycol in a molar ratio of the former to the latter of 1:1.05 to 1:2.0 and operated at a temperature of 240° to 285° C. under a pressure of the atmospheric pressure to $3 \times 10^5$ Pa, the second reactor is operated at a temperature of 250° to 290° C. under a pressure of the atmospheric pressure to 133 Pa, and the third reactor is operated at a temperature of 270° to 290° C. under a pressure of 200 to 13.3 Pa.

4. A process for continuously producing polyester according to claim 2, wherein a range for revolutions per minute of stirring vanes of the third reactor is from 0.5 rpm to 10 rpm.

5. A process for continuously producing polyester according to any one of claims 1 to 2, wherein the first reactor, the second reactor and the third reactor are operated for a reaction time of 4 to 8 hours in total.

6. A process for continuously producing polyester, which comprises a first reaction step of subjecting a mixture of an aromatic dicarboxylic acid or its derivative and a glycol in a molar ratio of the former to the latter of 1:1.05 to 1:2.0, as supplied thereto, to reaction at a temperature of 240° to 285° C. under a pressure of the atmospheric pressure to $3 \times 10^5$ Pa, a second reaction step of subjecting the product from the first reaction step to polycondensation at a temperature of 250° to 290° C. under a pressure of the atmospheric pressure to 133 Pa and a third reaction step of subjecting the product from the second reaction step to polycondensation at a temperature of 270° to 290° C. under a pressure of 200 to 13.5 Pa.

7. A process for continuously producing polyester, which comprises a first reaction step of subjecting a mixture of an aromatic dicarboxylic acid or its derivative and a glycol in a molar ratio of the former to the latter of 1:1.05 to 1:2.0 as supplied thereto, to reaction at a temperature of 240° to 285° C. under a pressure of the atmospheric pressure to $3 \times 10^5$ Pa, a second reaction step of subjecting the product from the first reaction step to polycondensation at a temperature of 250° to 290° C. under a pressure of the atmospheric pressure to 1.33 Pa and a third reaction step of subjecting the product from the second reaction step to polycondensation at a temperature of 270° to 290° C. under a pressure of 200 to 13.5 Pa, the first reaction step to the third reaction step being operated for a reaction time of 4 to 8 hours in total.

8. A process for continuously producing polyester, which comprises a first reaction step of subjecting a mixture of an aromatic dicarboxylic acid or its derivative and a glycol in a molar ratio of the former to the latter of 1:1.05 to 1:2.0 to reaction, as supplied thereto, at a temperature of 240° to 285° C. under a pressure of the atmospheric pressure to $3 \times 10^5$ Pa, thereby producing an oligoester or polyester having an average degree of polymerization of 3 to 7, a second reaction step of subjecting the reaction product from the first reaction step to reaction at a temperature of 250° to 290° C. under a pressure of the atmospheric pressure to 133 Pa, thereby producing a low molecular weight polymer having an average degree of polymerization of 20 to 40, and a third reaction step of subjecting the reaction product from the second reaction step to reaction at a temperature of 270° to 290° C. under a pressure of 200 to 13.3 Pa, thereby producing a high molecular weight polyester having an average degree of polymerization of 90 to 180.

9. A process for continuously producing polyester, which comprises a first reaction step of subjecting a mixture of an aromatic dicarboxylic acid or its derivative and a glycol in a molar ratio of the former to the latter of 1:1.05 to 1:2.0, as supplied thereto, to reaction at a temperature of 240° to 285° C. under a pressure of the atmospheric pressure to $3 \times 10^5$ Pa, thereby producing an oligoester or polyester having an average degree of polymerization of 3 to 7, a second reaction step of subjecting the product to polycondensation at a temperature of 250° to 290° C. under a pressure of the atmospheric pressure to 133 Pa, thereby producing a low molecular weight polymer having an average degree of polymerization of 20 to 40, and a third reaction step of subjecting the low molecular weight polymer to further polycondensation at a temperature of 270° to 290° C. under a pressure of 200 to 13.3 Pa to an average degree of polymerization of 90 to 180, thereby producing a high molecular weight polyester, the first reaction step to the third reaction step being operated for a reaction time of 4 to 8 hours in total.

10. A reactor for continuously producing polyester, the reactor being for use at the final reaction stage of a process for producing a high molecular weight polyester from an aromatic dicarboxylic acid or its derivative and a glycol, which comprises a substantially horizontal cylindrical vessel provided an inlet and an outlet for a liquid feed, respectively, at the lower part at one end thereof and at the lower part at the other end thereof in the longitudinal direction thereof, an outlet for volatile matters at the upper part thereof, and a stirring rotor provided with a plurality of hollow disks as connected to one another in the longitudinal direction thereof within the cylindrical vessel, and further provided with scraping plates each between the adjacent hollow disks for scraping the liquid feed attached to the inside wall of the vessel, the stirring rotor being without any rotating shaft at the position of rotating center axis, the stirring rotor comprising a plurality of stirring blocks depending on the viscosity level between the inlet and the outlet, the distance between the adjacent hollow disks being larger at the one end in the longitudinal direction of the vessel than at the other end, the inner diameter of the hollow disks being larger at the one end in the longitudinal direction of the vessel than at the other end and the scraping plate at the other end being discrete between the adjacent hollow disks.

11. A reactor for continuously producing polyester, the reactor being for use at the final reaction stage of a process for producing a high molecular weight polyester from an aromatic dicarboxylic acid or its derivative and a glycol, which comprises a substantially horizontal cylindrical vessel provided an inlet and an outlet for a liquid feed, respectively, at the lower part at one end thereof and at the lower part at the other end thereof in the longitudinal direction thereof, an outlet for volatile matters at the upper part thereof, and a stirring rotor provided with a plurality of hollow disks as connected to one another in the longitudinal direction thereof within the cylindrical vessel, and further provided with scraping plates each between the adjacent hollow disks for scraping the liquid feed attached to the inside wall of the vessel, the stirring rotor being without any rotating shaft at the position of rotating center axis, the stirring rotor comprising a plurality of stirring blocks depending on the viscosity level between the inlet and the outlet, the distance between the adjacent hollow disks being larger at the one end in the longitudinal direction of the vessel than at the other end, the inner diameter of the hollow disks being larger at the one end in the longitudinal direction of the vessel than at the other end and a hollow thin plate being provided between the adjacent hollow disks at the one end, the hollow thin plate having a smaller outer diameter than that of the adjacent hollow disks.

12. A reactor for continuously producing polyester, the reactor being for use at the intermediate reaction stage of a process for producing a high molecular weight polyester from an aromatic dicarboxylic acid or its derivative and a glycol, which comprises a substantially vertical cylindrical vessel provided with an inlet and an outlet for a liquid feed, respectively, at the lower side part thereof and at the bottom at the center thereof in the longitudinal direction thereof, an outer for volatile matters at the top thereof, a heating medium jacket provided around the outer periphery of the vessel body, a heat exchange section at the lower part thereof within the vessel, a residence section with helical baffer plates at the intermediate position thereof within the vessel for retaining and successively transferring the liquid feed from the above downwards, a space for gas-liquid separation at the upper position thereof within the vessel and a down pipe at the center thereof in the vertical direction of the vessel for flowing down the liquid feed as a thin film therethrough.

13. A natural circulation type evaporator without any mechanical stirrer, the evaporator being for use at the initial reaction stage of a process for producing a high molecular weight polyester from an aromatic dicarboxylic acid or its derivative and a glycol, which comprises a vertical cylindrical vessel provided with an inlet and an outlet for a liquid feed on the vessel body, a vapor pipe at the top thereof for discharging vapors, a heating medium jacket around the outer periphery of the vessel and a shell-and-tube type heat exchanger within the vessel for heating tube outsides and allowing the liquid feed to rise through the tubes, while the liquid feed flows downwards by natural convection between the inner wall of the vessel and the outer wall of the shell of the shell-and-tube type heat exchanger.

14. A process for continuously producing polyester, which comprises a first reactor for subjecting a mixture of an aromatic dicarboxylic acid or its derivative and a glycol in a molar ratio of the former to the latter of 1:1.05 to 1:2.0, as supplied thereto, to reaction at a temperature of 240° to 285° C. under a pressure of the atmospheric pressure to $3 \times 10^5$ Pa, a second reactor for subjecting the product from the first reactor to polycondensation at a temperature of 250° to 290° C. under a pressure of the atmospheric pressure to 133 Pa and a third reactor for subjecting the product from the second reactor to polycondensation at a temperature of 270° to 290° C. under a pressure of 200 to 13.3 Pa.

15. A process for continuously producing polyester, which comprises a first reactor for subjecting a mixture of an aromatic dicarboxylic acid or its derivative and a glycol in a molar ratio of the former to the latter of 1:1.05 to 1:2.0, as supplied thereto, to reaction at a temperature of 240° to 285° C. under a pressure of the atmospheric pressure to $3 \times 10^5$ Pa, a second reactor for subjecting the product from the first reactor to polycondensation at a temperature of 250° to 290° C. under a pressure of the atmospheric pressure to 133 Pa and a third reactor for subjecting the product from the second reactor to polycondensation at a temperature of 270° to 290° C. under a pressure of 200 to 13.3 Pa, the first reactor to the third reactor being operated for a reaction time of 4 to 8 hours in total.

16. An apparatus for continuously producing polyester, which comprises a first reactor for subjecting a mixture of an aromatic dicarboxylic acid or its derivative and a glycol in a molar ratio of the former to the latter of 1:1.05 to 1:2.0, as supplied thereto, to reaction at a temperature of 240° to 285° C. under a pressure of the atmospheric pressure to $3 \times 10^5$ Pa, thereby producing an oligoester or polyester having an average degree of polymerization of 3 to 7, a second reactor for subjecting the product to polycondensation at a temperature of 250° to 290° C. under a pressure of the atmospheric pressure to 133 Pa, thereby producing a low molecular weight polymer having an average degree of polymerization of 20 to 40, and a third reactor for subjecting the low molecular weight polymer to further polycondensation at a temperature of 270° to 290° C. under a pressure of 200 to 13.3 Pa to an average degree of polymerization of 90 to 180, thereby producing a high molecular weight polyester.

17. An apparatus for continuously producing polyester, which comprises a first reactor for subjecting a mixture of an aromatic dicarboxylic acid or its derivative and a glycol in a molar ratio of the former to the latter of 1:1.05 to 1:2.0, as supplied thereto, to reaction at a temperature of 240° to 285° C. under a pressure of the atmospheric pressure to $3 \times 10^5$ Pa, thereby producing an oligoester or polyester having an average degree of polymerization of 3 to 7, a second reactor for subjecting the product to polycondensation at a temperature of 250° to 290° C. under a pressure of the atmospheric pressure to 133 Pa, thereby producing a low molecular weight polymer having an average degree of polymerization of 20 to 40, and a third reactor for subjecting the low molecular weight polymer to further polycondensation at a temperature of 270° to 290° C. under a pressure of 200 to 13.3 Pa to an average degree of polymerization of 90 to 180, thereby producing a high molecular weight polyester, the first reactor, the second reactor and the third reactor being operated for a reaction time of 4 to 8 hours in total.

* * * * *